US012785175B2

(12) United States Patent
Camilleri

(10) Patent No.: US 12,785,175 B2
(45) Date of Patent: Nov. 3, 2026

(54) BATTERY SYSTEM AND METHOD WITH EVAPORATIVE COOLING

(71) Applicant: UNIVERSITY OF MALTA, Msida (MT)

(72) Inventor: Robert Camilleri, Msida (MT)

(73) Assignee: UNIVERSITY OF MALTA, Msida (MT)

( * ) Notice: Subject to any disclaimer, the term of this patent is extended or adjusted under 35 U.S.C. 154(b) by 1148 days.

(21) Appl. No.: 17/787,610

(22) PCT Filed: Dec. 23, 2019

(86) PCT No.: PCT/IB2019/061283

§ 371 (c)(1),
(2) Date: Jun. 21, 2022

(87) PCT Pub. No.: WO2021/130518

PCT Pub. Date: Jul. 1, 2021

(65) Prior Publication Data

US 2022/0367943 A1 Nov. 17, 2022

(51) Int. Cl.
*H01M 10/6569* (2014.01)
*H01M 10/613* (2014.01)
(Continued)

(52) U.S. Cl.
CPC ..... *H01M 10/6569* (2015.04); *H01M 10/613* (2015.04); *H01M 10/6551* (2015.04);
(Continued)

(58) Field of Classification Search
CPC ............. H01M 10/65; H01M 10/6551; H01M 10/6556; H01M 10/656; H01M 10/6363;
(Continued)

(56) References Cited

U.S. PATENT DOCUMENTS

2012/0244403 A1* 9/2012 Maskew ................ B60L 50/16 429/99
2013/0034757 A1* 2/2013 Doyle .................. H01M 50/35 429/89
(Continued)

FOREIGN PATENT DOCUMENTS

CN 110192304 A 8/2019
DE 102013017396 A1 * 4/2015 .......... H01M 10/613
(Continued)

OTHER PUBLICATIONS

3M Electronics Materials: "3M Novec 7000 Engineered Fluid/product information", Nov. 25, 2014, pp. 1-6, XP055727060.
(Continued)

*Primary Examiner* — Nicholas A Smith
(74) *Attorney, Agent, or Firm* — Rivka Friedman

(57) ABSTRACT

A battery system includes a pressure vessel with a lid which encloses a battery pack having at least one battery cell in thermal contact with a porous wick. The battery pack is partly submerged in a heat transfer fluid, which is in a liquid phase. Evaporation of the heat transfer fluid from the porous
(Continued)

wick maintains the temperature of the battery cell within an operational temperature range.

21 Claims, 5 Drawing Sheets

(51) Int. Cl.

| | |
|---|---|
| ***H01M 10/6551*** | (2014.01) |
| ***H01M 10/6556*** | (2014.01) |
| ***H01M 10/6563*** | (2014.01) |
| ***H01M 50/271*** | (2021.01) |
| ***H01M 50/317*** | (2021.01) |

(52) U.S. Cl.
CPC ... *H01M 10/6556* (2015.04); *H01M 10/6563* (2015.04); *H01M 50/271* (2021.01); *H01M 50/317* (2021.01)

(58) Field of Classification Search
CPC ......... H01M 10/6567; H01M 10/6569; H01M 50/30; H01M 50/308; H01M 50/31; H01M 50/333; H01M 50/271; H01M 50/317
See application file for complete search history.

(56) References Cited

U.S. PATENT DOCUMENTS

| | | | | |
|---|---|---|---|---|
| 2017/0047625 | A1* | 2/2017 | Bhunia | F28D 15/0233 |
| 2018/0034116 | A1* | 2/2018 | Tajima | H01M 10/6569 |
| 2018/0134116 | A1 | 5/2018 | Chen et al. | |
| 2018/0145382 | A1* | 5/2018 | Harris | H01M 10/643 |

FOREIGN PATENT DOCUMENTS

| | | | | |
|---|---|---|---|---|
| EP | 2403034 | A1 * | 1/2012 | F28D 15/0266 |
| JP | 2010211963 | A | 3/2009 | |
| JP | 2012015112 | A | 7/2010 | |
| JP | 2016146298 | A | 2/2015 | |

OTHER PUBLICATIONS

International Search Report for PCT/IB2019/061283 Mailed on Sep. 21, 2020.
Chinese OA for CN2019810103262.1 Mailed on May 16, 2025.

* cited by examiner

BATTERY SYSTEM AND METHOD WITH EVAPORATIVE COOLING

TECHNICAL FIELD

The invention relates to battery systems, and specifically, to battery systems with a cooling mechanism.

BACKGROUND OF THE INVENTION

Batteries are a key enabling technology to electrify transportation and to transform the power generation industry by taking full advantage of intermittent renewable energy sources. In particular, rechargeable Lithium ion batteries have become the energy storage technology of choice for many applications requiring high energy density, long battery life, high electrical discharge rate, low self-discharge properties, no memory effect, and very low maintenance.

However, the existing batteries are not without drawbacks, which derive from the limited stability of their internal chemistry. When charged or discharged at high rate, the individual cells in a battery pack generate considerable heat because of their internal resistance. If the rate of heat generation exceeds the rate of heat dissipation, the core temperatures of the battery cells will rise. A rise in core temperature not only reduces overall battery life, but it may lead to thermal runaway and catastrophic battery failure. Furthermore, Lithium ion batteries with very high power densities currently employ flammable liquids to enhance the mobility of Lithium ions within the cell. In these batteries, overheating also presents a fire hazard.

As an example of internal heating of a battery cell, a typical 18650-type, Lithium ion rechargeable battery cell has an average direct-current internal resistance of 30 milli-ohms. When current between the battery terminals reaches 20 amperes, the ohmic heating power is 12 watts. Thus, a battery pack having one thousand such battery cells would generate, and need to dissipate, 12 kilowatts of thermal power. The heat must be dissipated to avoid thermal overload. Additionally, in electric vehicles, the problem of heat dissipation is further compounded by the need for the battery system to be lightweight and have a small form factor, in order to meet vehicle design and performance requirements.

One approach to extend battery life, improve performance, and reduce or eliminate the risk of thermal runaway in a high energy density battery system, is through the use of a Battery Management Sub-system (or BMS). The BMS typically controls the charge/discharge rates of a battery pack so that the temperature of the battery cells is maintained within a predetermined operational temperature range, such as 15 to 35 degrees Celsius (° C.) for Lithium ion batteries. The BMS remains active even when an electric vehicle is off. For example, during offline recharging of a battery pack, the BMS controls the charging rate to prevent overheating, even though this may lengthen the time needed for recharging.

However, the BMS has the disadvantage of imposing limits on the performance envelope of an electric vehicle. For example, during regenerative braking, which uses mechanical energy to fast charge the battery cells, the BMS may suspend or limit the regeneration to prevent thermal overload. As another example, during hill climbing and fast acceleration which demand high battery discharge rates of the battery cells, the BMS may limit the magnitude or duration of the acceleration, to prevent thermal overload.

The rate of heat dissipation from the battery cells may be enhanced by a variety of thermodynamic cooling mechanisms, such as forced air convection, indirect cooling, heat pipes, and direct immersion in liquid. Forced air convection, in which fans blow ambient or cooled air over a battery pack, is easy to implement, but results in poor heat dissipation. Indirect cooling, in which the battery pack is connected by a manifold to an external radiator or heat exchanger, is typically impractical for an electric vehicle because of weight and form factor limitations. Heat pipes are impractical for similar reasons. Furthermore, indirect cooling of large battery packs is plagued by large temperature variations between cells and large temperature gradients within cells. Direct immersion in a liquid with a high specific heat capacity facilitates cooling by thermal conduction and convection in the liquid, however, the requirement for a large liquid volume and weight is a major drawback.

SUMMARY OF THE INVENTION

The present invention provides a battery system and method, which uses evaporative cooling to dissipate large heat loads, while maintaining light weight and a small form factor.

The present invention provides a battery system including a pressure vessel with a lid which encloses a battery pack having at least one battery cell in thermal contact with a porous wick. The battery pack is partly submerged in a heat transfer fluid, which is in a liquid phase. Evaporation of the heat transfer fluid from the porous wick maintains the temperature of the battery cell within an operational temperature range.

Embodiments of the invention are directed to a battery pack. The battery pack comprises: at least one battery cell including a longitudinal axis and configured for operating within a predetermined temperature range; a wick in thermal communication with the at least one battery cell, the wick at least partially enveloping the at least one battery cell; and, the wick of a porous material, which is configured, when wetted, to control a fluid flow along the wick, in a direction substantially parallel to the longitudinal axis, so as to maintain the at least one battery cell at a temperature which is within the predetermined temperature range.

Optionally, the battery pack is such that the wick is comprised of at least one material selected from a group consisting of polyester, polyamide, polypropylene, cotton, and viscose.

Optionally, the battery pack is such that the at least one battery cell is a Lithium ion battery cell.

Optionally, the battery pack is such that the at least one battery cell is cylindrical or prismatic in shape.

Optionally, the battery pack is such that the predetermined temperature range is less than or equal to approximately 35 degrees Celsius.

Optionally, the battery pack is such that the at least one battery cell includes a plurality of battery cells.

Embodiments of the invention are directed to a battery system. The battery system comprises: a pressure vessel; and, at least one battery pack within the pressure vessel. The at least one battery pack comprises: at least one battery cell including a longitudinal axis and configured for operating within a predetermined temperature range; a wick in thermal communication with the at least one battery cell, the wick at least partially enveloping the at least one battery cell, and, the wick of a porous material, which is configured, when wetted, to control a fluid flow along the wick, in a direction substantially parallel to the longitudinal axis, so as to maintain the at least one battery cell at a temperature which is within the predetermined temperature range.

Optionally, the battery system is such that the pressure vessel includes an enclosed chamber covered by a lid.

Optionally, the battery system is such that the at least one battery cell includes a plurality of battery cells.

Optionally, the battery system is such that the wick is comprised of at least one material selected from a group consisting of polyester, polyamide, polypropylene, cotton, and viscose.

Optionally, the battery system is such that the at least one battery cell is a Lithium ion battery cell.

Optionally, the battery system is such that the at least one battery cell is cylindrical or prismatic in shape.

Optionally, the battery system is such that the predetermined temperature range is less than or equal to 35 degrees Celsius.

Optionally, the battery system is such that a surface of the lid is configured for cooling by forced air convection.

Optionally, the battery system is such that the lid is configured to function as a heat sink.

Optionally, the battery system is such that the lid includes conduits for transporting coolant therethrough.

Optionally, the battery system is such that the conduits are configured for communication with a source of heat exchange fluid.

Optionally, the battery system is such that the lid includes at least one pressure relief valve.

Optionally, the battery system is such that the lid includes an electrical feed-through.

Optionally, the battery system is such that a surface of the pressure vessel includes an electrical feed-through.

Optionally, the battery system is such that it additionally comprises heat transfer fluid in the pressure vessel extending to a predetermined height, so as to partially immerse the wick.

Optionally, the battery system is such that the heat transfer fluid is in a liquid phase and has a predetermined boiling point temperature and a predetermined heat of vaporization.

Optionally, the battery system is such that the predetermined heat of vaporization is greater than or equal to 100 Joules per gram of the heat transfer fluid.

Optionally, the battery system is such that the predetermined boiling point temperature is approximately equal in value to a maximum of the predetermined temperature range.

Optionally, the battery system is such that a volume of the heat transfer fluid is between approximately 5% and approximately 30% of an internal volume of the pressure vessel.

Optionally, the battery system is such that it additionally comprises a battery management sub-system within the pressure vessel.

Optionally, the battery system is such that it additionally comprises: a wicking pad in thermal communication with the battery management subsystem.

Optionally, the battery system is such that the wicking pad is of a porous material.

Embodiments of the invention are directed to a method for evaporative cooling of a battery system. The method comprises: providing a pressure vessel and at least one battery pack within the pressure vessel, the battery pack comprising at least one battery cell and a wick; placing the wick in thermal communication with the at least one battery cell; providing a heat transfer fluid in a liquid phase having a predetermined boiling point temperature and a predetermined heat of vaporization; filling the pressure vessel with the heat transfer fluid up to a predetermined height, thereby partially immersing the wick in the heat transfer fluid; and, dissipating heat from a surface of the at least one battery cell by evaporation of the heat transfer fluid.

Unless otherwise defined herein, all technical and/or scientific terms used herein have the same meaning as commonly understood by one of ordinary skill in the art to which the invention pertains. Although methods and materials similar or equivalent to those described herein may be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE DRAWINGS

Some embodiments of the present invention are herein described, by way of example only, with reference to the accompanying drawings. With specific reference to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

Attention is now directed to the drawings, where like reference numerals or characters indicate corresponding or like components. In the drawings.

DETAILED DESCRIPTION OF THE DRAWINGS

Figure 1:
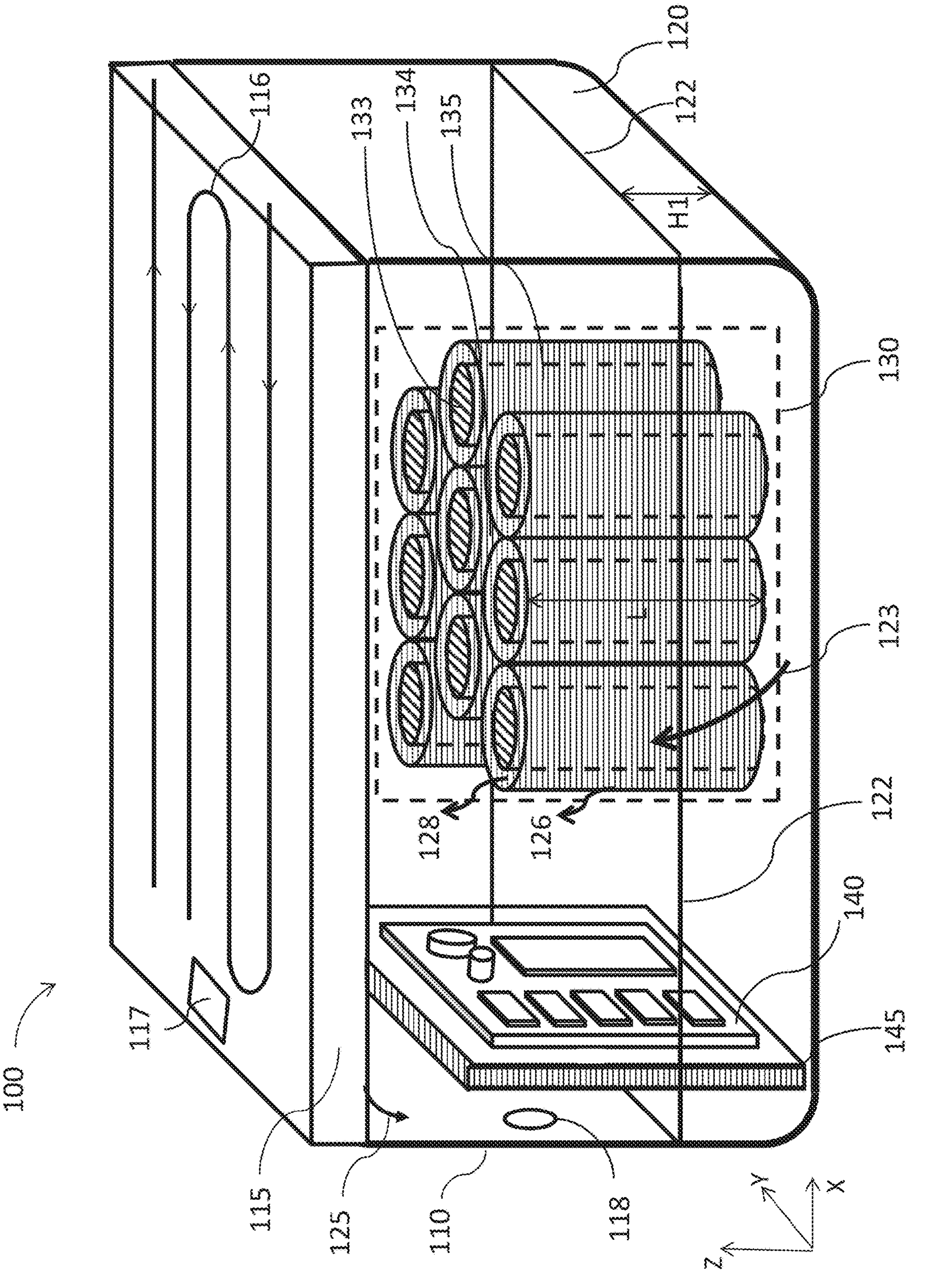
FIG. 1 is a perspective view of an exemplary battery system, in accordance with the present invention.

FIG. 1 shows a perspective view of an exemplary battery system 100 in accordance with the present invention. In the system 100, an exemplary orientation is based upon the vectors X, Y, and Z which are mutually orthogonal. Throughout this document, references to directions and orientations, such as upward, downward, upper, lower, up, down, top, bottom, and the like, are made. These references are exemplary, for describing and explaining the present invention, and embodiments thereof, and are not limiting in any way.

The system 100 includes a pressure vessel 110, which is internal to system 100. The pressure vessel 110 is oriented with the Z-axis pointing in an approximately vertical direction, which is perpendicular to the plane X-Y. The pressure vessel 110 includes a detachable lid 115, which, for example, forms a fluid (gas and/or liquid) seal for the vessel 110. The pressure vessel 110 encloses a battery pack 130 and a battery management sub-system (BMS) 140, both of which have been assembled inside the pressure vessel 110. A heat transfer fluid (HTF) 120 is provided and reaches, for example, a surface level 122, to a height indicated by H1. For example, the volume of the HTF 120 varies between approximately 5% to approximately 30% of the interior volume of the pressure vessel 110. This variable volume of the HTF 120 allows for a range of operating conditions for the battery system 100.

The lid 115 is, for example, cooled by an externally supplied heat exchange fluid, such as a refrigerant coolant, flowing through thermally conducting conduits 116, for example, cooling conduits 116 embedded in the lid 115. A pressure relief valve 117 in the detachable lid 115 prevents the internal pressure from exceeding a predetermined safety value. A feed-through 118 enables electrical power cables and signal cables to pass through a wall of the pressure vessel 110. Alternatively, the feed-through 118 may be positioned on the detachable lid 115 or along any of the walls of the pressure vessel 110.

The battery pack 130 includes, for example, a multiplicity of battery cells 133, each of which has a longitudinal axis "L" approximately parallel to the Z-axis, and is at least partly surrounded by a porous wick 135. The battery cells 133 are in electrical communication with each other, for example, by being wired in a series-parallel electrical circuit, and the BMS 140 is electrically wired to the battery pack 130 (circuit and wiring not shown in FIG. 1). The BMS 140 includes an electrical circuit, which is mounted on a board (not shown) and placed in thermal contact with a porous wicking pad 145.

The porous wick 135 conforms to the shape of the individual battery cell 133, so that there is thermal contact at the interface of the wick 135 and the corresponding battery cell 133. While the battery cell 133 is shown as having a cylindrical shape in FIG. 1, other shapes are suitable. For example, the battery cell 133 may have a prismatic shape, such as that of Lithium-ion polymer batteries. Additionally, the wick 135 may completely surround a battery cell 133, as shown in FIG. 1, or it may have cutouts such that the wick 135 partly surrounds the battery cell 133.

A porous wicking pad 145 provides evaporative cooling to the BMS 140, using the same HTF as the wick 135. The porous wicking pad 145 is in thermal contact with the surface of the BMS 140 which is opposite to the surface containing electrical circuit components, as shown schematically in FIG. 1. The wick 135 and the wicking pad 145, for example, have the same material composition. Example materials are those such as a twisted fiber blend of 80% polyester and 20% polyamide (by weight), with porosities of approximately 30% to 70%. Additionally, material compositions for the wick 135 and porous wicking pad 145 are provided in Table 1, below.

The gaps 134 existing between adjacent wicks 135 form channels, through which evaporating HTF vapor escapes towards the lid 115. The tiling geometry of the battery cells 133 in the battery pack 130 is, for example, hexagonal, as shown in FIG. 1. The wicks 135 of adjacent battery cells 133 form a closely packed planar array. Alternatively, the wicks 135 of adjacent battery cells 133 are, for example, spaced apart, depending on space constraints of the battery pack.

The HTF 120 is, for example, a non-corrosive, non-flammable, electrically insulating dielectric fluid, with a boiling point temperature at or below the upper end of the operational temperature range of the battery cells 133, which is typically 35° C., and with a heat of vaporization greater than 100 Joules per gram. The thermal conductivity (k) of the HTF 120 is greater than a predetermined minimum value of typically 0.05 Watts per meter per degree Celsius. High thermal conductivity provides for the HTF temperature to be essentially the same throughout the vessel 110; thereby reducing the temperature variation between battery cells. An exemplary material for the HTF 120 is, for example, 3M™ Novec™ 7000 Engineered Fluid (1-methoxyheptafluoropropane).

Capillary flow, represented by the arrow 123, causes HTF levels to rise inside of the wicks 135. The steady-state wicking height (H2) depends upon the density (ρ) and the surface tension (γ) of the HTF 120, the advancing liquid contact angle (θ) between the HTF and the wick material, the mean wick pore radius (R), and the acceleration of gravity (g), according to Jurin's law:

$$H2 = 2\gamma\cos\theta/(\rho g R) \quad \text{(Equation 1)}$$

Equation 1 is valid over a wide range of pore radii R, typically from 3 micrometers to 100 micrometers. Equation 1 indicates that, over this range, a small pore radius, of approximately 3 to 20 micrometers, achieves a large wicking height (H2).

The pore radius R depends, for example, on the geometry of the filaments that make up the wick material. The filaments may be twisted, in which case a higher twist level, as measured in units of turns per meter, generally yields a smaller value of pore radius R, for the same filament dimensions. For example, the maximum wicking height (H2) is typically achieved with twist levels in the range of 100 to 300 turns per meter. Outside of this range, higher values of twist level may yield pore radii which are too small for Equation 1 to be valid.

The contact angle θ depends upon the material compositions of the HTF 120 and of the wick 135, and is, for example, as close to zero as possible.

For proper operation of evaporative cooling, the value of the wicking height (H2) is, for example, greater than or equal to (L−H1), where L and H1 are the height of the top of the battery cell 133 and of the surface 122, respectively, above the bottom of the vessel 110. When this condition on the value of H2 is met, HTF 120 typically wets the entire wick 135 up to the top of battery cell 135.

HTF evaporates from the surfaces of wick 135 that are in contact with air, giving rise to vapor flows represented by the arrows 126 and 128, emitted by the lateral and top surfaces of wick 135, respectively. The vapor rises towards the lid 115, where it condenses into a liquid, generating an HTF return flow represented by the arrow 125, and raising the HTF surface level 122.

Figure 2:
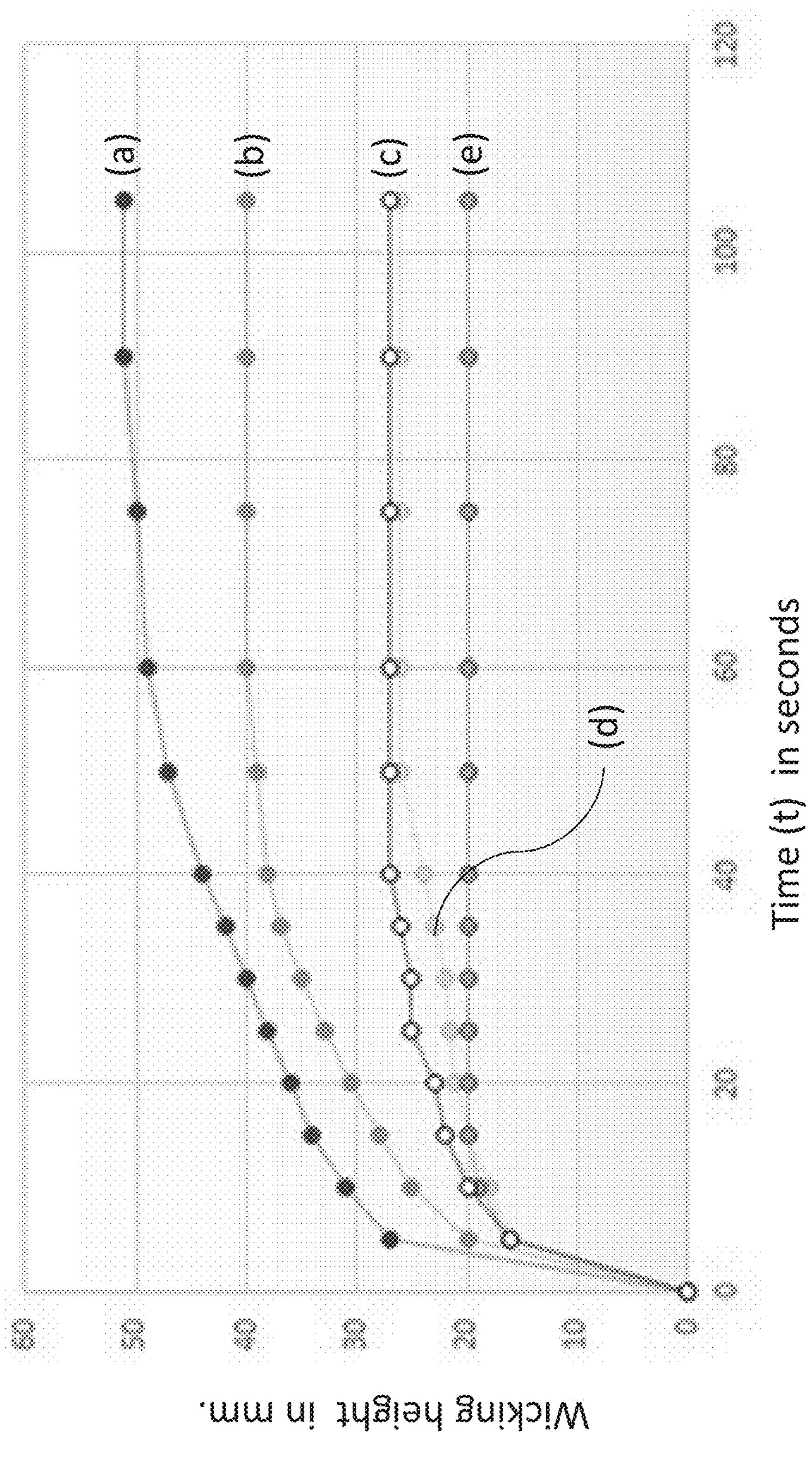
FIG. 2 is a graph showing experimental plots of wicking height versus wetting time for different wick materials of the battery system of FIG. 1.

FIG. 2 is a graph showing experimental plots of the wicking height, in millimeters (mm) versus wetting time (t) in seconds, for five different types of wick material, labeled (a)-(e). In the experiment, a dry wick was placed in a bath of HTF at an initial time t=0, and the wicking height began to rise under the action of capillary pressure. The wicking height initially increased linearly with time, and then leveled off to a steady-state value, given by H2 in equation 1. The initial time rate of change of the wicking height (U) depended primarily upon the dynamic viscosity of the HTF and the pore radius R of the wick. Table 1, below, shows the wick material and experimentally determined values of U and of H2 for each of the five curves in FIG. 2.

TABLE 1

| Case | Wick Material | U (mm/s) | H2 (mm) |
|---|---|---|---|
| (a) | 80% polyester, 20% polyamide | 5.2 | 52 |
| (b) | 50% polyester, 50% cotton | 4.0 | 40 |
| (c) | 30% polyester, 70% viscose | 3.2 | 27 |
| (d) | 15% polypropylene, 85% viscose | 3.2 | 26 |
| (e) | 100% viscose | 3.2 | 20 |

The maximum values of U and H2 are obtained in case (a) corresponding to an 80-20 blend of polyester and polyamide.

Figure 3:
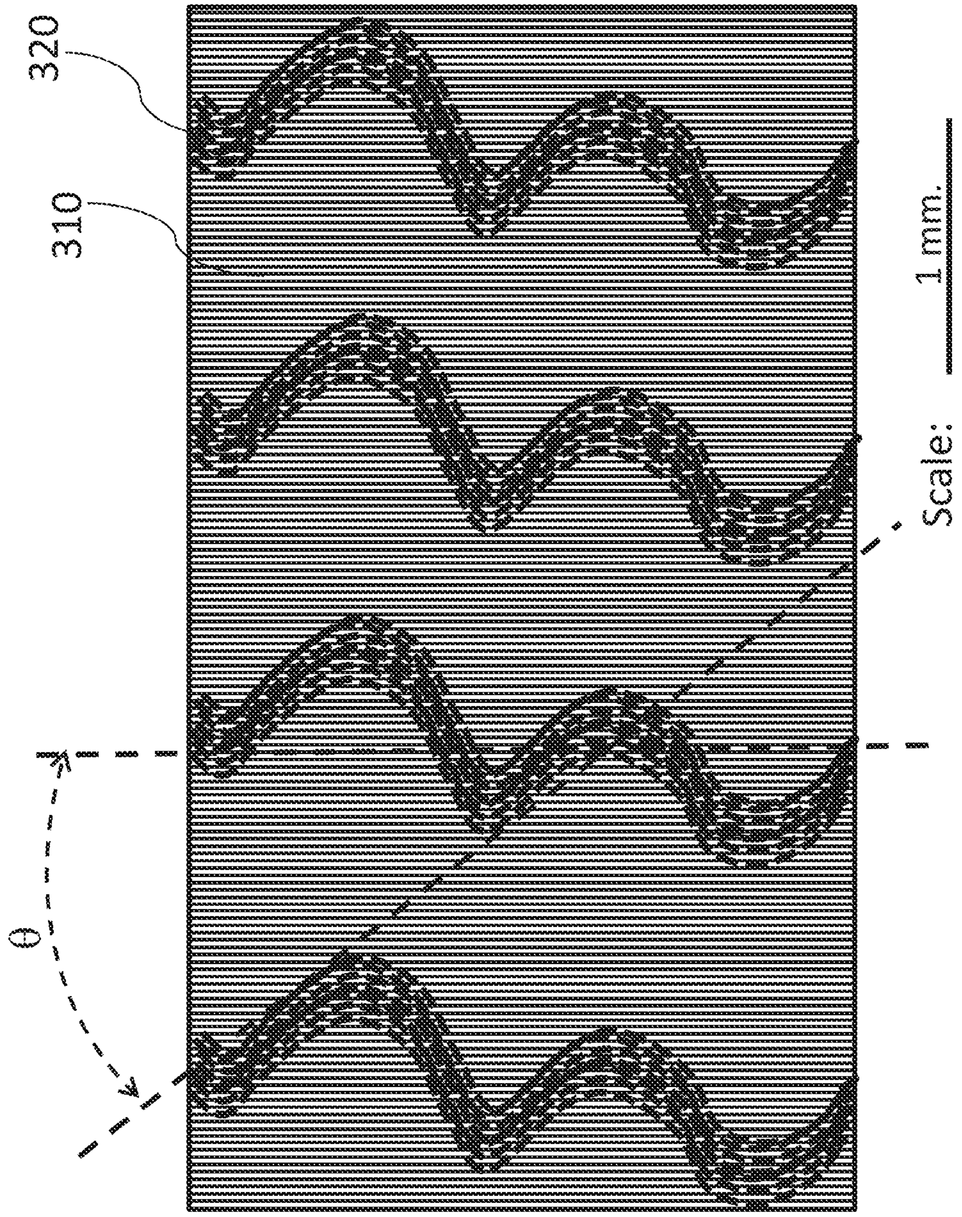
FIG. 3 is a magnified drawing of an exemplary wick material for the battery system of FIG. 2.

FIG. 3 shows a drawing of the 80-20 blend corresponding to case (a) from Table 1, based on a magnified image made with an optical microscope. An area 310 with vertical shading corresponds to polyester yarn, and area 320 with heavy dashed shading corresponds to polyamide yarn. The polyamide yarn forms a swirling pattern at an angle (θ) of about forty degrees with respect to the polyester yarn. This enhances capillary pressure and eliminates the need for excess liquid (i.e., HTF) which includes excess weight and renders cooling inefficient.

Figure 4:
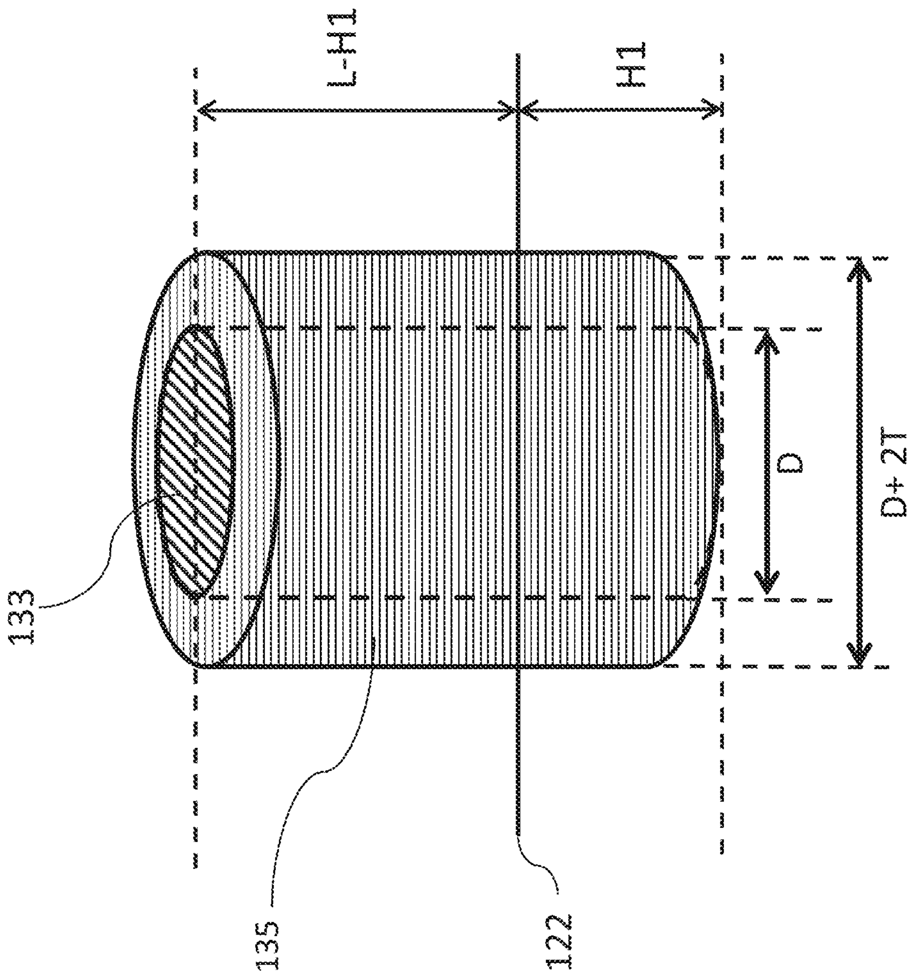
FIG. 4 is a cross-sectional diagram of an exemplary battery pack, in accordance with the present invention; and, FIG. 5 is a block diagram of an exemplary method for the manufacture of the battery system of FIG. 1, in accordance with the present invention.

FIG. 4 is a cross-sectional diagram of a battery pack including a single battery cell 133 and a porous wick 135, according to another embodiment of the invention. The battery cell diameter and the wick thickness are indicated by D and T, respectively, and are in units of millimeters (mm). Battery cell 133 is immersed in HTF 120 up to surface level 122. Below surface level 122, cooling occurs through thermal convection between the wick and HTF 120. Above the surface level 122, heat is dissipated by evaporative cooling (evaporation) from the wick 135. Evaporative cooling is more efficient than thermal convection, per unit area of battery surface, because of the high latent heat of vaporization of HTF 120.

The evaporated liquid is replenished by capillary flow 123 into the wick at a mass flow rate given by the Equation:

$$dm_W/dt=\pi\rho(U/2)T(D+T)\alpha \qquad \text{(Equation 2)}$$

where $m_W$ is the mass of HTF in the wick, U/2 is an approximation to the time-averaged capillary flow rate, and α is the wick porosity, which is a dimensionless parameter typically between 30% and 75%.

Ignoring all sources of cooling except for that provided by evaporative cooling, the above mass flow rate should, and typically must, equal or exceed the value of P/q, where P is the maximum thermal power dissipated by battery cell 133, and q is the latent heat of evaporation in Joules per gram of the HTF. Thus, the wick thickness (T) should, and typically must satisfy the condition of Equation 3, as follows:

$$T(D+T)\geq 2\ P/(\pi\rho q\ U\ \alpha) \qquad \text{(Equation 3)}$$

which places a lower limit on the value of T.

The thermal flow of heat from the exterior surface of the battery 133, through the thickness of the wick 135, should, and typically must, be in a range which prevents film boiling. The onset of film boiling limits evaporative cooling to a thin region at an interface between the wick and the battery cell, preventing the entire thickness of the wetted wick from contributing to evaporative cooling. Also, the onset of film boiling requires superheating of the battery cell surface to temperatures well above the maximum operating temperature.

EXAMPLE

This Example illustrates example parameters to attain a required maximum cooling power of P=12 watts per battery cell. Exemplary components of the system are as follows:

(a) Battery cell: Samsung™ 18650-type Lithium ion battery, model number INR18650-30Q, having a nominal capacity of 3000 milli-ampere-hours (mAh); a maximum discharge current of 20 amperes; a maximum heat dissipation of P=12 watts; a diameter of D=18.33 mm; and a height equal to 64.85 mm.

(b) Heat transfer fluid (HTF): 3M™ Novec™ 7000 engineered fluid (1-methoxyheptafluoropropane); a boiling point of 34° C.; a latent heat of vaporization of q=142 Joules per gram, a thermal conductivity of k=0.075 watts per meter per ° C.; a liquid density of ρ=1.4 grams/cubic centimeter; a kinematic viscosity of 0.32 centistokes; and a dielectric constant of 7.4; at standard temperature and pressure (25° C. and 1 atmosphere).

(c) Wick: a twisted fiber blend of 80% polyester and 20% polyamide (by weight) having a wicking rate of U=5.2 mm/second, and a nominal wick porosity of α=0.5.

The exemplary HTF is chemically compatible with the porous wick material, the battery cell, and the BMS as well as being non-toxic, non-flammable, non-corrosive, and flame retardant.

Substituting numerical parameter values into Equation 3 yields $T(D+T)\geq 14.8\ mm^2$, which, for a cell diameter of D=18.33 mm, implies a wick thickness T which is greater than or equal to 0.78 mm.

Method of Manufacture

Figure 5:
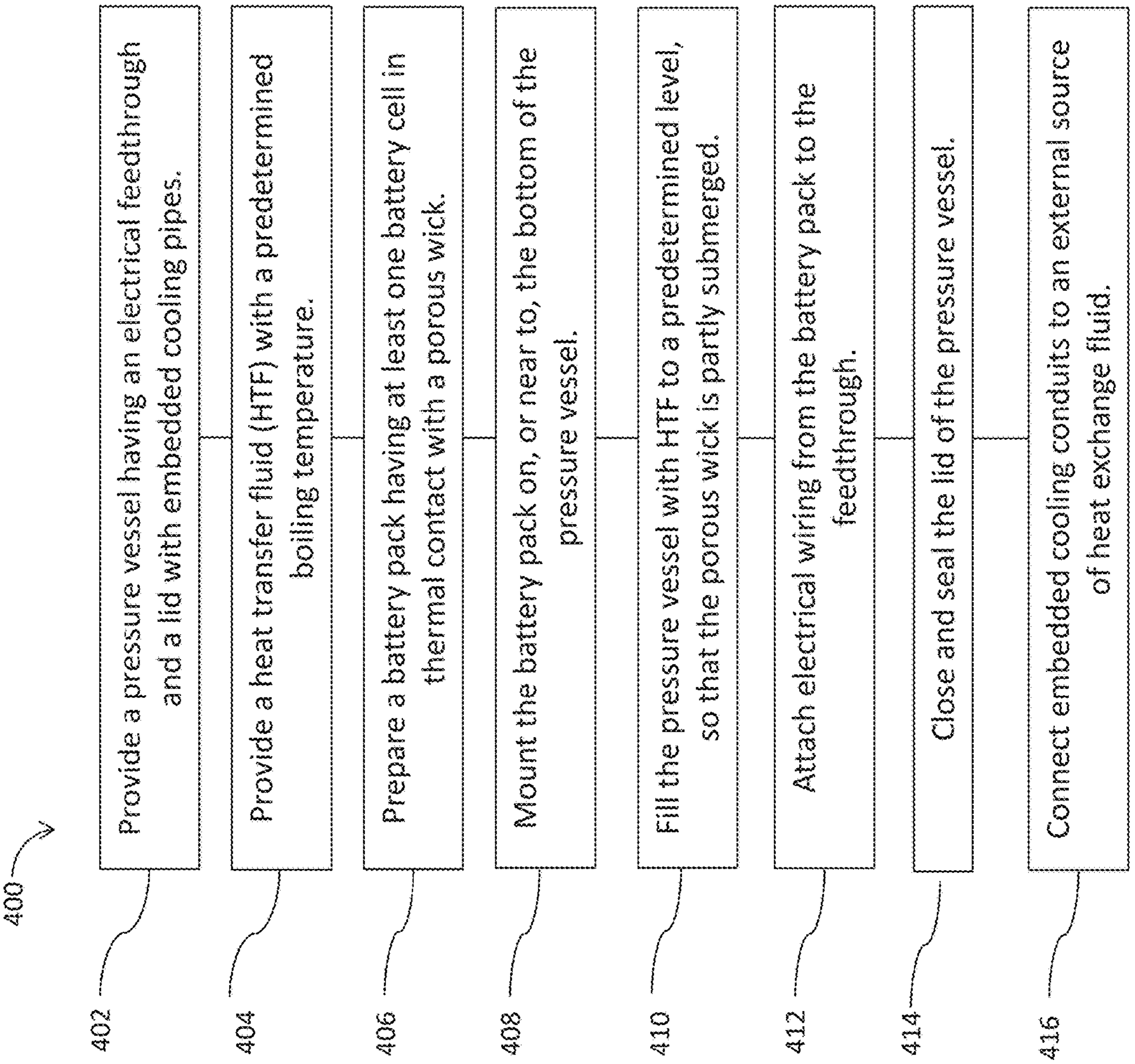

FIG. 5 is a block diagram of an exemplary process or method 400 for the manufacture of the battery system of FIG. 1. The process includes subprocesses and the method is performed by the subprocesses of blocks 402-416, as follows:

402—providing a pressure vessel having an electrical feed-through and a lid with embedded cooling conduits;

404—providing a heat transfer fluid (HTF) with a predetermined boiling temperature;

406—preparing a battery pack having at least one battery cell in thermal contact with a porous wick;

408—mounting the battery pack on, or near to, the bottom of the pressure vessel;

410—filling the pressure vessel with HTF to a predetermined level, so that the porous wick is partly submerged;

412—attaching electrical wiring from the battery pack to the feed-through;

414—closing and sealing the lid of the pressure vessel; and

416—connecting the embedded cooling conduits to an external source of heat exchange fluid.

In the event that a BMS 140 is also to be cooled by evaporative cooling, as disclosed herein, step (block 406) includes preparing a BMS 140 which is in thermal contact with a porous wicking pad 145, and the filling in step (block 410) also causes the porous wicking pad 145 to be partly submerged.

Alternative embodiments may include, for example, replacing individual wicks around each of the battery cells in the battery pack 130, with an array of bored aperture holes of diameter D extending into a block of porous wicking material. A battery cell may be inserted into each bored aperture hole. To maintain structural rigidity, the block of material may be surrounded by a rigid frame made of a high-density polymer material, such as high density polyethylene.

Other alternative embodiments may include coating the inside of each bored aperture hole with a thermally conductive paste, so as to ensure thermal contact between each battery cell and the block of porous material.

Still other alternative embodiments may include a battery system having heating elements that are activated in very cold weather (e.g., low termperatures) to prevent the HTF temperature from falling below a lower limit of the battery operational temperature range. For example, for Lithium ion batteries, the lower temperature limit is approximately 15° C.

It will be appreciated that the above descriptions are intended only to serve as examples, and that many other embodiments are possible within the scope of the present invention as defined in the appended claims.

The invention claimed is:

1. A battery system comprising:
- a closable pressure vessel which when closed is sealed from the ambient environment;
- at least one battery pack within the pressure vessel, the at least one battery pack including a longitudinal axis and configured for operating within a predetermined temperature range;
- a wick at least partially enveloping and in thermal communication with the at least one battery pack;
- wherein the wick is of a porous material which is configured, when wetted, to control a fluid flow along the wick in a direction substantially parallel to the longitudinal axis, to maintain the at least one battery pack within the predetermined temperature range, and to reduce a temperature variation within the at least one battery pack and
- a battery management system electrically coupled to the at least one battery pack and in thermal communication with a wicking pad;
- wherein when a heat transfer fluid is in the pressure vessel, the wick and the wicking pad are at least partially submerged in the heat transfer fluid to maintain the at least one battery pack and the battery management system within the predetermined temperature range.

2. The battery system of claim 1, wherein the wicking pad is of a porous material.

3. The battery system of claim 1, wherein the wick is comprised of at least one material selected from a group consisting of polyester, polyamide, polypropylene, cotton, and viscose.

4. The battery system of claim 1, wherein the at least one battery pack comprises a Lithium ion battery cell.

5. The battery system of claim 1, wherein the at least one battery pack comprises a battery cell having a cylindrical or prismatic shape.

6. The battery system of claim 1, wherein the predetermined temperature range is less than or equal to 35 degrees Celsius.

7. The battery system of claim 1, wherein the closable pressure vessel includes a detachable lid.

8. The battery system of claim 7, wherein a surface of the lid is configured for cooling by forced air convection.

9. The battery system of claim 7, wherein the lid is configured to function as a heat sink.

10. The battery system of claim 7, wherein the lid includes conduits for transporting coolant therethrough.

11. The battery system of claim 7, wherein the lid includes at least one pressure relief valve.

12. The battery system of claim 7, wherein the lid includes an electrical feed-through.

13. The battery system of claim 1, additionally comprising heat transfer fluid in the pressure vessel extending to a predetermined height, so as to partially immerse the wick and the wicking pad.

14. The battery system of claim 13, wherein the closeable pressure vessel is configured for communication with a source of the heat transfer fluid.

15. The battery system of claim 13, wherein a surface of the pressure vessel includes an electrical feed-through.

16. The battery system of claim 13, wherein the heat transfer fluid is in a liquid phase and has a predetermined boiling point temperature and a predetermined heat of vaporization.

17. The battery system of claim 16, wherein the predetermined heat of vaporization is greater than or equal to 100 Joules per gram of the heat transfer fluid.

18. The battery system of claim 16, wherein the predetermined boiling point temperature is approximately equal in value to a maximum of the predetermined temperature range.

19. The battery system of claim 13, wherein a volume of the heat transfer fluid is between approximately 5% and approximately 30% of an internal volume of the closable pressure vessel.

20. The battery system of claim 1, wherein the battery management system electrically coupled with the at least one battery pack is via wired connections.

21. A method for evaporative cooling of a battery system comprising:
- providing a pressure vessel, at least one battery pack within the pressure vessel, a wick, a battery management system, and a wicking pad;
- placing the wick in thermal communication with the at least one battery pack and the wicking pad in thermal communication with the battery management system;
- providing a heat transfer fluid in a liquid phase having a predetermined boiling point temperature and a predetermined heat of vaporization;
- filling the pressure vessel with the heat transfer fluid up to a predetermined height, thereby partially immersing the wick and the wicking pad in the heat transfer fluid; and,
- dissipating heat from a surface of the at least one battery pack and the battery management system by evaporation of the heat transfer fluid.

* * * * *